US012602711B2

(12) United States Patent
Prchal et al.

(10) Patent No.: US 12,602,711 B2
(45) Date of Patent: Apr. 14, 2026

(54) SYSTEM AND METHOD OF PROVIDING EXTERIOR WORK ESTIMATE

(71) Applicant: Gunner Holdings LLC, Stamford, CT (US)

(72) Inventors: Edward Prchal, Greenwich, CT (US); Andrew Prchal, Greenwich, CT (US)

(73) Assignee: Gunner Holdings LLC, Stamford, CT (US)

( * ) Notice: Subject to any disclaimer, the term of this patent is extended or adjusted under 35 U.S.C. 154(b) by 0 days.

(21) Appl. No.: 18/386,543

(22) Filed: Nov. 2, 2023

(65) Prior Publication Data

US 2024/0161159 A1 May 16, 2024

Related U.S. Application Data

(60) Provisional application No. 63/424,667, filed on Nov. 11, 2022.

(51) Int. Cl.
*G06Q 30/0283* (2023.01)
(52) U.S. Cl.
CPC ................................. *G06Q 30/0283* (2013.01)
(58) Field of Classification Search
CPC .................................................. G06Q 30/0283
USPC ........................................ 705/400, 7.11, 1.1
See application file for complete search history.

(56) References Cited

U.S. PATENT DOCUMENTS 10,528,962 B2 1/2020 Rattner et al.
10,559,126 B2 * 2/2020 Bouazizi ................. G06T 17/10

11,030,355 B2 6/2021 Pershing
2018/0075550 A1 3/2018 Thornberry et al.
(Continued)

FOREIGN PATENT DOCUMENTS

CA 3132952 A1 * 4/2022 ........... G06F 3/0484
CA 3215411 A1 * 10/2022 ............. G06T 15/04
(Continued)

OTHER PUBLICATIONS

Wolski, K et al. "Selecting Texture Resolution Using a Task-specific Visibility Metric." Computer graphics forum 38.7 (2019): 685-696. Web. (Year: 2019).*

(Continued)

*Primary Examiner* — Akiba K Robinson
(74) *Attorney, Agent, or Firm* — Meister Seelig & Fein PLLC

(57) ABSTRACT

A system to generate an estimate on exterior work, the system comprising a measurements database configured to store measurements data of structures, a renderer configured to generate a three-dimensional rendering, and a platform configured to accept a user input comprising identifying information identifying a structure and a worksite corresponding to a selected portion of the identified structure, to forward a query including the identifying information to the measurements database, to receive a data set for the identified structure from the measurements database in response to the query, to parse the received data set for data points relating to the identified worksite, to request a rendering of the worksite from the renderer based on the parsed data points, to receive the rendering from the renderer, and to generate an estimate on exterior work for the worksite based on the parsed data points.

27 Claims, 10 Drawing Sheets

(56)                    References Cited

U.S. PATENT DOCUMENTS

| | | | |
|---|---|---|---|
| 2018/0189750 A1 | 7/2018 | Nonaka et al. | |
| 2020/0089991 A1 | 3/2020 | Steenhoek et al. | |
| 2023/0070842 A1* | 3/2023 | Wei | G16H 40/20 |

FOREIGN PATENT DOCUMENTS

| | | | | | |
|---|---|---|---|---|---|
| CN | 102204337 | A | * | 9/2011 | H04W 36/0061 |
| CN | 113011327 | A | * | 6/2021 | |
| KR | 102204337 | B1 | * | 1/2021 | G06Q 30/0633 |

OTHER PUBLICATIONS

Xuetao et al., "Generating 3D Building Models from Architectural Drawings:—A Survey", Jan./Feb. 2009, Published by the IEEE Computer Society, Jan./Feb. 2009, pp. 20-30 (Year: 2009).*

* cited by examiner

<u>10</u>

Create user profile — S201

Enter identifying information — S202

Retrieve measurements data set — S203

Parse data set — S204

Generate rendering — S205

User edits? — S206

Y

N

Generate Estimate — S207

FIG. 8

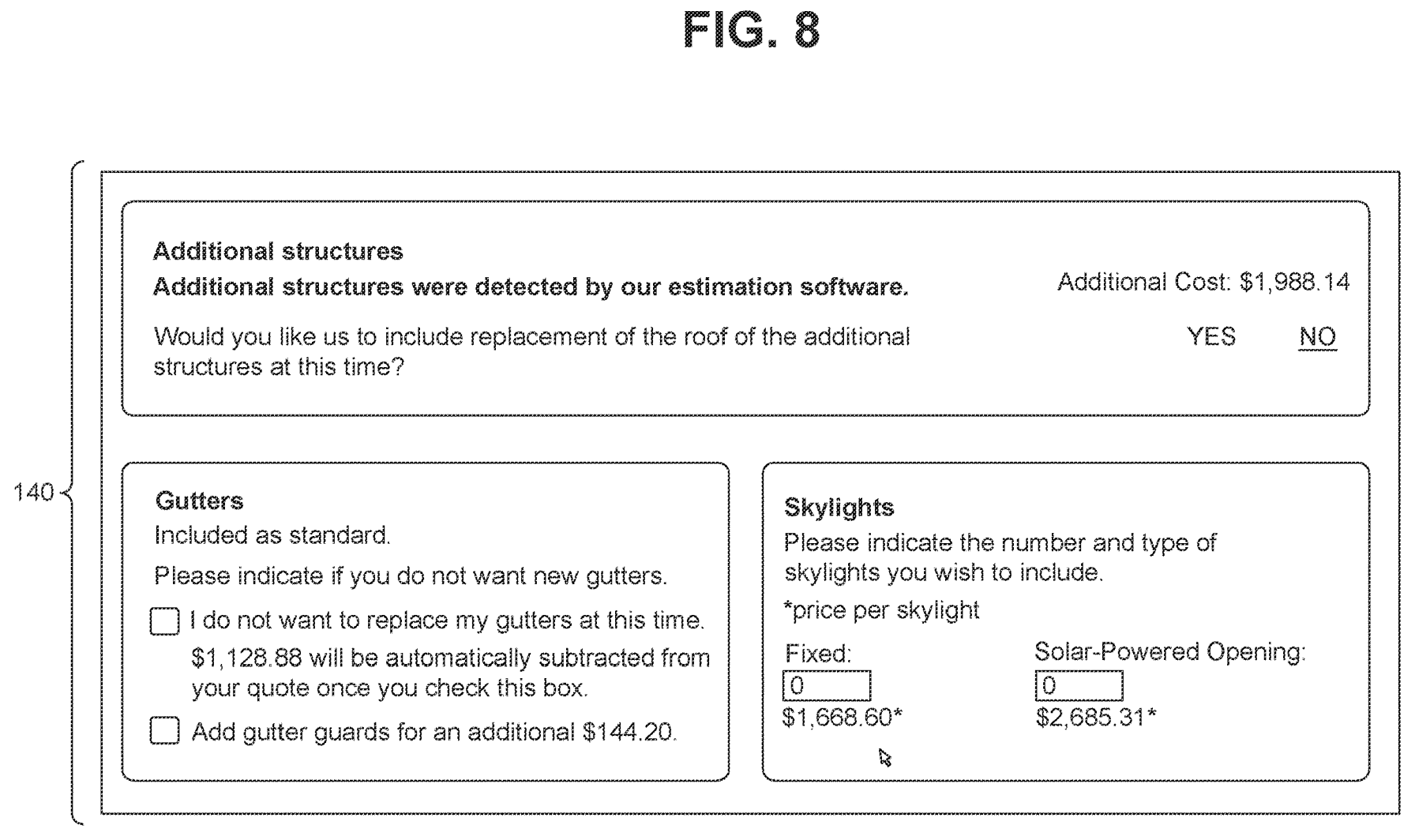

Additional structures

Additional structures were detected by our estimation software.

Would you like us to include replacement of the roof of the additional structures at this time?

Additional Cost: $1,988.14

YES    NO

Gutters

Included as standard.

Please indicate if you do not want new gutters.

☐ I do not want to replace my gutters at this time. $1,128.88 will be automatically subtracted from your quote once you check this box.

☐ Add gutter guards for an additional $144.20.

Skylights

Please indicate the number and type of skylights you wish to include.

*price per skylight

Fixed:

0

$1,668.60*

Solar-Powered Opening:

Welcome, Joe

Your Customer Experience Manager:

Becky Blake

Phone: 203-321-7735

Email:
becky@gunnerroofing.com

Order Summary

15 Butternut Hollow Rd,
Greenwich, CT 06830

(If you notice an error in your address or wish to make changes to your quote, please contact us immediately at 866-262-6005 or email us at info@gunnerroofing.com.)

Replace Roof - hickory

Skylights, fixed: 2

See full description of work

Project Checklist

| Requirement | Note | Last Update | Complete |
|---|---|---|---|
| Contract | Signed: 2023-08-03 21:30:22 (click to view) | 8/3/2023 | ☑ |

Payments

| Type | Title | Amount | Date |
|---|---|---|---|
| credit | Progress payment #3 | $1,022.89 | 8/3/2023 |

150

1

SYSTEM AND METHOD OF PROVIDING EXTERIOR WORK ESTIMATE

CROSS-REFERENCE TO RELATED APPLICATIONS

This application claims priority under 35 U.S.C. § 119(e) from U.S. Provisional Application No. 63/424,667, filed on Nov. 11, 2022, in the United States Patent and Trademark Office, the disclosures of which is incorporated herein in its entirety by reference.

BACKGROUND

Buildings periodically require exterior repair work, such as a new roof or replacement siding. Before any such work can be done the building's owner must obtain an estimate for the work, including materials, labor, local fees, etc. Conventionally the owner secures such an estimate by calling a professional to the property and having them take measurements on-site, including details such as length, width, and slope of the sections to be worked on. This process is often time-consuming, requiring the owner to set aside a significant amount of time to meet with the professional. It is also not an exact science, with no guarantee the quote will be accurate. For example, the professional's measurements may be incorrect, leading to the wrong amount of supplies being ordered. Additionally, different exterior features require different considerations. For example, a flat roof, meaning a roof with a very low pitch, does not drain water as quickly as a traditional roof, and so requires different roofing materials. If the professional does not calculate the roof pitch correctly, they may miss a flat roof and therefore not bring the right type of roofing for the project.

Furthermore, customers often have difficulty envisioning what the finished exterior work will look like. For example, the roof is customarily out of view, making it difficult to envision what a replacement roof might look like. This can be difficult when choosing, for example, shingle colors. Customers are often forced to take their best guess at details, and then they must live with the result even if it ends up being something they do not like.

Still further, when there has been a disaster such as a storm or a hurricane, insurance companies want an exact estimate of how much repairs to a structure will cost. Due to the difficulty and unreliability of conventional estimates, homeowners are often unable to get insurance to cover the cost of repairs, because they do not reliably know what the repairs will cost.

There is therefore a need for a way to get an accurate and reliable estimate for exterior work on a structure.

SUMMARY OF THE INVENTION

Exemplary embodiments of the present general inventive concept provide systems and methods to provide an estimate on exterior work on a structure.

Additional features and utilities of the present general inventive concept will be set forth in part in the description which follows and, in part, will be obvious from the description, or may be learned by practice of the general inventive concept.

The foregoing and/or other features and utilities of the present general inventive concept may be achieved by providing a system to generate an estimate on exterior work, the system including a measurements database configured to store measurements data of structures, a renderer configured to generate a three-dimensional rendering, and a platform configured to accept a user input comprising identifying information identifying a structure and a worksite corresponding to a selected portion of the identified structure, to forward a query including the identifying information to the measurements database, to receive a data set for the identified structure from the measurements database in response to the query, to parse the received data for data points relating to the identified worksite, to request a rendering of the worksite from the renderer based on the parsed data points, to receive the rendering from the renderer, and to generate an estimate on exterior work for the worksite based on the parsed data points.

In an exemplary embodiment, the platform may be configured to determine a shape and dimensions of the worksite based on the parsed data points.

In an exemplary embodiment, the platform may determine one or more polygons which define the shape of the worksite.

In an exemplary embodiment, the renderer may be configured to apply a texture to the rendering, the texture representing proposed exterior work on the worksite.

In an exemplary embodiment, the renderer may be configured to adjust the texture to account for imperfections in the worksite.

In an exemplary embodiment, the platform may be further configured to determine locations of structural features of the identified structure based on the received data set.

In an exemplary embodiment, the platform may be further configured to determine and fill in missing data on the identified structure in the received data set, based on the parsed data points.

In an exemplary embodiment, the platform may be further configured to modify the rendering according to user commands, and to generate the estimate for the exterior work based on the user commands.

In an exemplary embodiment, the platform may be further configured to connect to an external database to determine if a damaging event has occurred at the identified structure within a preset time.

The foregoing and/or other features and utilities of the present general inventive concept may be achieved by providing a method of generating an estimate on exterior work, the method including storing measurements data of structures at a measurements database, accepting a user input at a platform, the user input comprising identifying information identifying a structure and a worksite, the worksite corresponding to a selected portion of the identified structure, forwarding a query including the identifying information to the measurements database, receiving a data set for the identified structure from the measurements database in response to the query, parsing the received data set for data points relating to the identified worksite, generating a three-dimensional rendering of the worksite based on the parsed data points, and generating an estimate on exterior work for the worksite based on the parsed data points.

In an exemplary embodiment, the method may include determining a shape and dimensions of the worksite based on the parsed data points.

In an exemplary embodiment, the method may include determining one or more polygons which define the shape of the worksite.

In an exemplary embodiment, the method may include applying a texture to the rendering, the texture representing proposed exterior work on the worksite.

In an exemplary embodiment, the method may include adjusting the texture to account for imperfections in the worksite.

In an exemplary embodiment, the method may include determining locations of structural features of the identified structure based on the received data set.

In an exemplary embodiment, the method may include determining and filling in missing data on the identified structure in the received data set, based on the parsed data points.

In an exemplary embodiment, the method may include modifying the rendering according to user commands, and generating the estimate for the exterior work based on the user commands.

In an exemplary embodiment, the method may include connecting to an external database to determine if a damaging event has occurred at the identified structure within a preset time.

BRIEF DESCRIPTION OF THE DRAWINGS

FIG. 8 illustrates a user interface to adjust an estimate for exterior work according to an exemplary embodiment of the present general inventive concept; and FIG. 9 illustrates a user interface to display work details according to an exemplary embodiment of the present general inventive concept.

DETAILED DESCRIPTION OF EXEMPLARY EMBODIMENTS OF THE INVENTIVE CONCEPT

Figure 1:
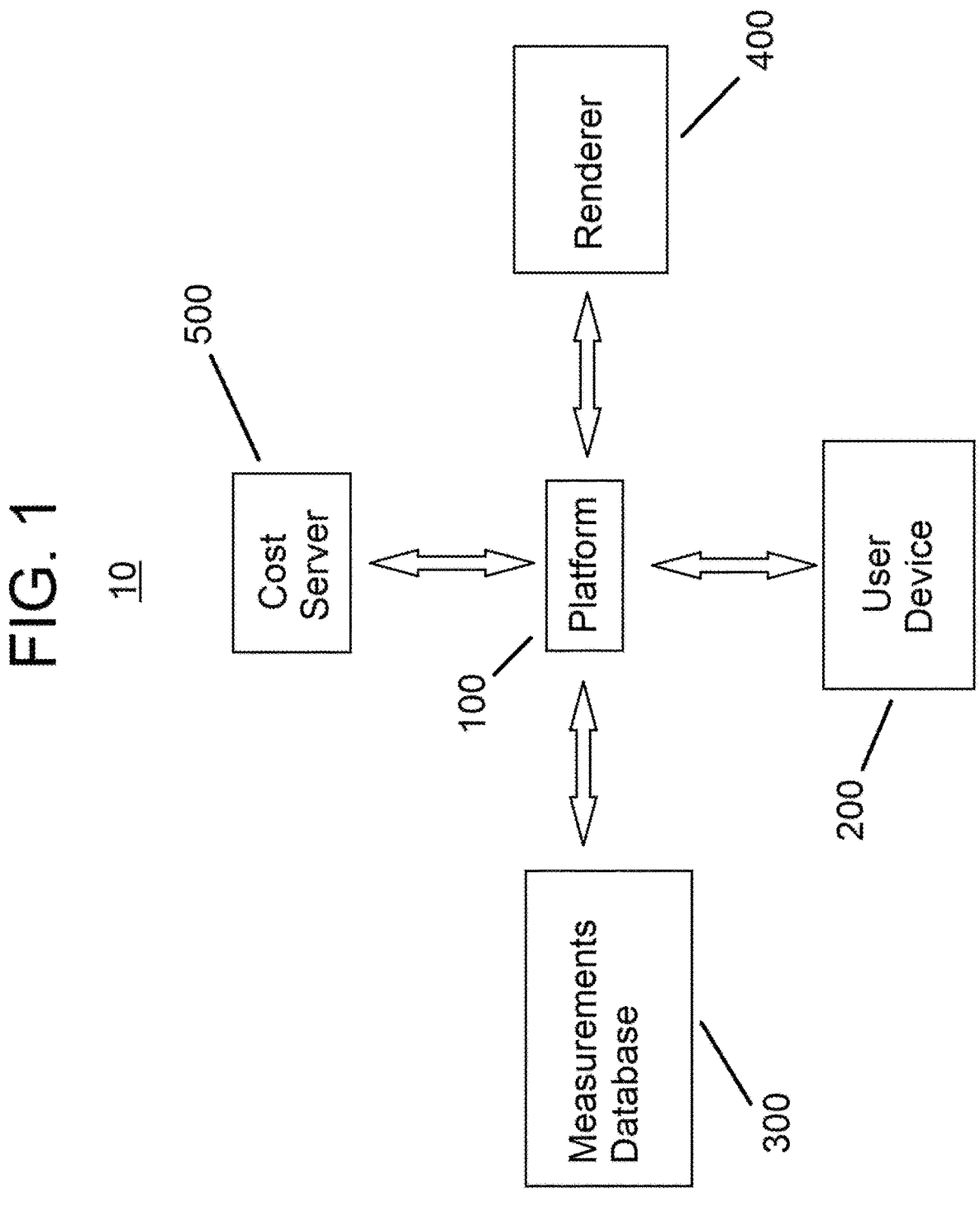
FIG. 1 illustrates a block diagram of a system to generate an estimate for exterior work according to an exemplary embodiment of the present general inventive concept.

Reference will now be made in detail to embodiments of the present general inventive concept, examples of which are illustrated in the accompanying drawings, wherein like reference numerals refer to the like elements throughout. The embodiments are described below in order to explain the present general inventive concept while referring to the figures. Also, while describing the present general inventive concept, detailed descriptions about related well-known functions or configurations that may diminish the clarity of the points of the present general inventive concept are omitted.

Expressions such as "at least one of," when preceding a list of elements, modify the entire list of elements and do not modify the individual elements of the list.

All terms including descriptive or technical terms which are used herein should be construed as having meanings that are obvious to one of ordinary skill in the art. However, certain terms may have different meanings according to an intention of one of ordinary skill in the art, case precedents, or the appearance of new technologies. Also, some terms may be arbitrarily selected by the applicant, and in this case, the meaning of the selected terms will be described in detail in the detailed description of the invention. Thus, the terms used herein have to be defined based on the meaning of the terms together with the description throughout the specification.

Also, when a part "includes" or "comprises" an element, unless there is a particular description contrary thereto, the part can further include other elements, not excluding the other elements.

Hereinafter, one or more exemplary embodiments of the present general inventive concept will be described in detail with reference to accompanying drawings.

FIG. 1 illustrates a system 10 to provide estimates on exterior work according to an exemplary embodiment of the present general inventive concept. For the purposes of this application, "exterior work" includes work on any portion of a structure's exterior, including walls, roof, and so on. In the examples detailed below, roofing work is used as an example of the type of exterior work the user seeks an estimate for. It will be understood that systems and methods according to exemplary embodiments of the present general inventive concept can also provide estimates for other exterior work, such as, for example, siding repair or replacement, through processes similar to those described below with reference to the Figures.

As illustrated in FIG. 1, a system 10 according to exemplary embodiments of the present general inventive concept may include a platform 100, a user device 200, a measurements database 300, a renderer 400, and a cost server 500.

According to exemplary embodiments of the present general inventive concept, the platform 100 may be a portal by which a user may enter identifying information for a structure identifying a worksite, and generate an estimate for exterior work on that worksite. The worksite may correspond to a structure or part of a structure the user wishes to get an estimate for exterior work on, for example the roof of a house. According to exemplary embodiments of the present general inventive concept, the platform 100 may be a website or server that a user may access through the user device 200. The identifying information may be any information which may be used to identify a worksite for exterior work. According to exemplary embodiments of the present general inventive concept, the identifying information may be a street address of a structure. The identifying information may further include an indication of which part of the structure is the intended worksite, e.g., roof, siding, windows, etc. According to exemplary embodiments of the present general inventive concept, the platform 100 may also allow the user to generate a user profile including, e.g., the user's name and a password or other security measures to control access to and control over the work being requested. The platform 100 may additionally perform calculations and transformations of data, according to exemplary embodiments of the present general inventive concept described in greater detail below.

The user device 200 may be any device which a user may use to interact with the platform 100. According to exemplary embodiments of the present general inventive concept, the user device 200 may be a laptop, PC, smartphone, or the like. According to exemplary embodiments of the present general inventive concept, the user device 200 may be integrated with the platform 100, or may be a separate device communicating with the platform 100 via a wired or wireless connection such as, for example, LAN, Bluetooth, Wi-Fi, 4G, etc. The user device 200 may display a user interface allowing entry of commands and display of results via, e.g., a touchscreen, a keyboard and monitor, etc. Examples of a user interface are described below with reference to FIGS. 3, 4, 6B, 8, and 9. Furthermore, according to exemplary embodiments of the present general inventive concept, the system 10 may include one or multiple user devices 200, each one allowing another user to access and use the platform 100 at the same time.

The measurements database 300 may store measurements data of one or more structures in a given area, including houses, garages, sheds, barns, condominiums, apartment complexes, and similar buildings. For the purposes of this application, "measurements data" may include any information by which the measurements of a structure may be obtained. According to exemplary embodiments of the present general inventive concept, measurements data may include direct measurements, e.g., the footprint for a structure, the height, etc. According to an exemplary embodiment of the present general inventive concept, the measurements data may include spatial coordinates for one or more points defining the shape of a structure, for example the location of corners, edges, flat surfaces, and similar features. According to exemplary embodiments of the present general inventive concept, the data in the measurements database 300 may be obtained, for example, by aerial or satellite photographs which may be subsequently processed to determine the dimensions of structures photographed before the determined dimensions are stored in the measurements database 300. Alternatively, or in addition, photographs of the structures may be stored directly in the measurements database 300 as measurements data. According to exemplary embodiments of the present general inventive concept, the measurements database 300 may be a single server storing the measurements data, or may be a set of servers, each storing measurements data for structures in a particular geographic area. The platform 100 may access whichever part of the measurements database 300 includes the measurements for the identified worksite. According to exemplary embodiments of the present general inventive concept, the measurements database 300 and the platform 100 may be integrated into the same server. According to other exemplary embodiments of the present general inventive concept, the measurements database 300 may be local to the platform 100 and accessed via, e.g., a LAN or a wired connection. According to other exemplary embodiments of the present general inventive concept, the platform 100 may remotely access the measurements database 300 via the Internet or a similar connection.

The renderer 400 may be a server or computer capable of generating a 3D rendering based on input information. Similarly to the measurements database 300, according to exemplary embodiments of the present general inventive concept the renderer 400 may be local or remote to the platform 100, and may communicate with the platform 100 via, e.g., wired connection, LAN, the Internet, or the like. According to another exemplary embodiment of the present general inventive concept, the renderer 400 may be integrated with the platform 100.

Figure 2:
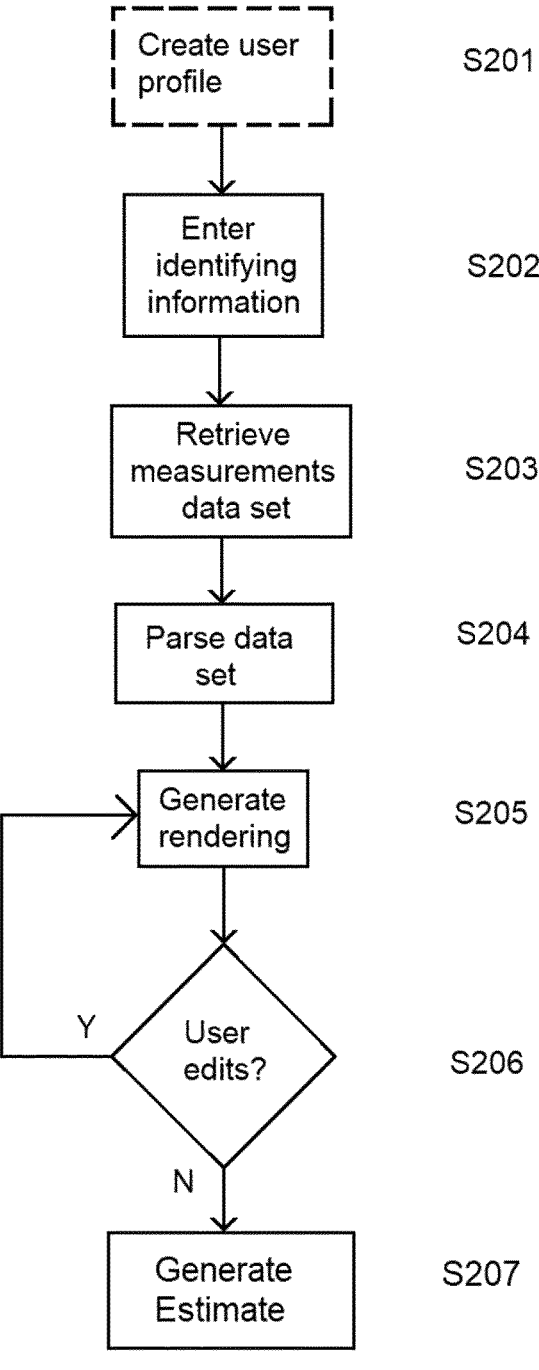
FIG. 2 illustrates a flow chart of a process to generate an estimate for exterior work according to an exemplary embodiment of the present general inventive concept.
Figure 3:
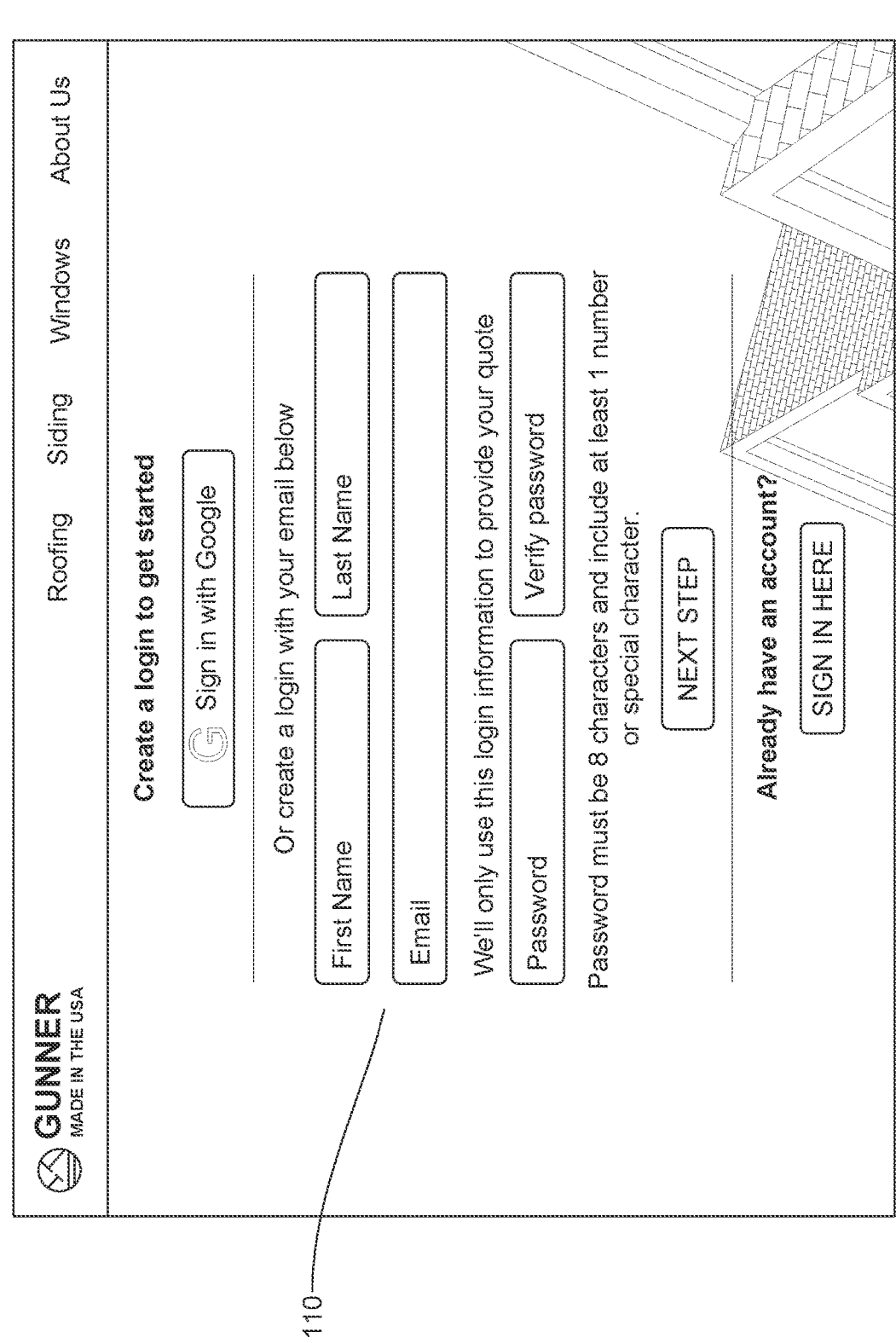
FIG. 3 illustrates a user interface to login on a platform according to an exemplary embodiment of the present general inventive concept.

FIG. 2 illustrates a flow chart of a process to generate an estimate for exterior work according to an exemplary embodiment of the present general inventive concept. At step S201, a user may access the platform 100 through the user device 200 and generate a user profile. A user interface 110 allowing for profile creation according to an exemplary embodiment of the present general inventive concept is illustrated in FIG. 3. As illustrated therein, the user interface 110 may include, e.g., areas for a user to enter their name, contact method such as e-mail, and a password. Step S201 is illustrated in FIG. 2 in dashed lines to indicate it is optional and may not be used in some exemplary embodiments of the present general inventive concept.

Figure 4:
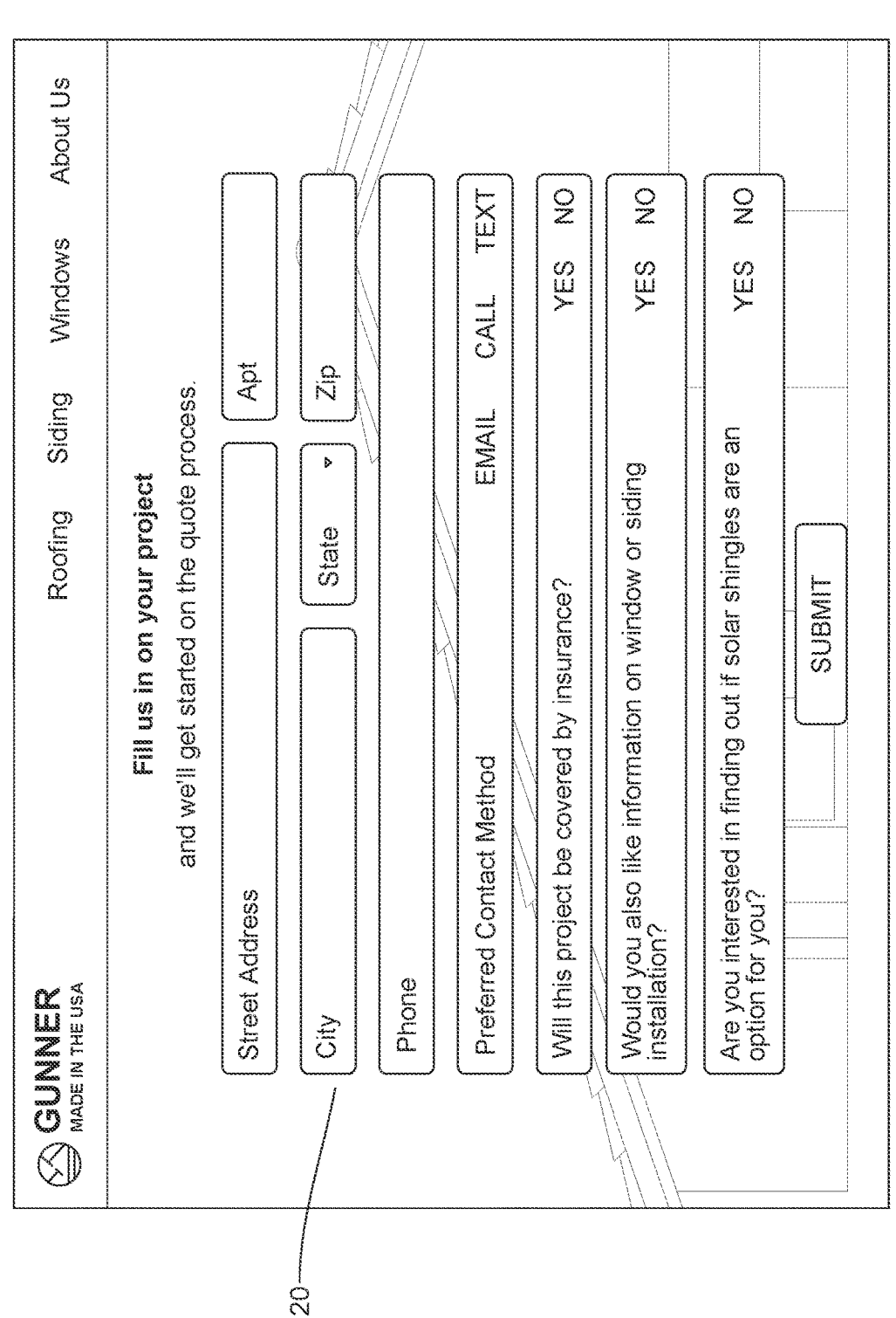
FIG. 4 illustrates a user interface to enter identifying information on a platform according to an exemplary embodiment of the present general inventive concept.

At Step S202, a user may enter identifying information for a worksite into the platform 100 via the user device 200. FIG. 4 illustrates a user interface 120 displayed on the user device 200 to enter this identifying information according to an exemplary embodiment of the present general inventive concept. As illustrated therein, the identifying information may include, e.g., an address of a structure. According to other exemplary embodiments of the present general inventive concept, the identifying information may also include, for example, an indication of which portion of the structure is the intended worksite, for example the roof, the siding, the windows, etc. When the user designates a worksite, the process illustrated in FIG. 2 may proceed on a default assumption that the desired exterior work is replacement of all materials at that worksite, for example a new roof, replacement siding, new windows, etc. At step S206, described in detail below, the user may specify more particularly what kind of exterior work is desired at the selected worksite.

At step S203, the platform 100 may convert this identifying information into a format readable by the measurements database 300, and forward the converted identifying information to the measurements database 300 as part of a query for information on the identified worksite. According to exemplary embodiments of the present general inventive concept, the measurements database 300 may receive this query and return a data set for the identified worksite structure to the platform 100 as a response to the query. According to exemplary embodiments of the present general inventive concept, this data set may not be human-readable. For example, the data set may be an XML or JSON file including the spatial coordinates of a plurality of points defining part or all of the identified structure. If the identified worksite is a roof, the data set may include spatial coordinates of points defining the roof.

According to exemplary embodiments of the present general inventive concept, the data from the measurements database 300 may further include information on structural features which would need to be designed around in the desired exterior work. For example, if the received data points for the worksite describe a roof, the measurements database 300 may further include information on the size and location of boots, chimneys, etc., which may be present on the roof, and which a replacement roof would need to be built around. According to exemplary embodiments of the present general inventive concept, the data from the measurements database 300 may further include details on materials a structure is made from, for example indicating whether a structure's roof uses asphalt or cedar shingles. According to other exemplary embodiments of the present general inventive concept, the platform 100 may determine the materials a structure is made from based on the data from the measurements database 300, for example by analyzing images of the worksite.

According to exemplary embodiments of the present general inventive concept, the data set received from the measurements database 300 may further include information which the platform 100 may use to determine other features of an identified structure, such as windows and overhangs. For example, if the data set received from the measurements database 300 describes a roof at a worksite structure, the data set may further include one or more aerial or "birds-eye" images of the structure, as well as information on the position of the camera that captured the images, allowing the platform 100 to identify structural features appearing in the images and determine their location on the structure. If a structural feature such as, for example, a window or an overhang, appears in one or more images included with data points for a roof, the platform 100 may identify that feature in the image(s), and determine the feature's location on the structure as well as its size with reference to the available roof geometry.

Returning to FIG. 2, at Step S204 the platform 100 may receive the data set from the measurements database 300 and parse it for necessary data points to generate a rendering of the structure and to generate an estimate for exterior work. If, for example, a user has identified the worksite as a roof to be replaced, the platform 100 may parse the data set for the coordinates of a plurality of points, these points defining polygons that make up the roof. Based on the points, the platform 100 may determine the length of each side of each polygon, and use this information to calculate the area of these polygons. Once the area of each polygon is determined, the platform 100 may calculate an area of the roof as measured in squares—a roofing term corresponding to approximately 100 square feet. The platform 100 may further parse the provided data set for relevant structural features of the work site, e.g., roof features such as rakes, eaves, valleys, and hip ridges. The platform 100 may also perform additional calculations based on the parsed data points in order to obtain an accurate picture of the structure. For example, the platform 100 may calculate features such as the pitch of each plane of the roof to determine roof slope, specifically determining if any portions of the roof are flat, i.e., very low slope.

Figure 5:
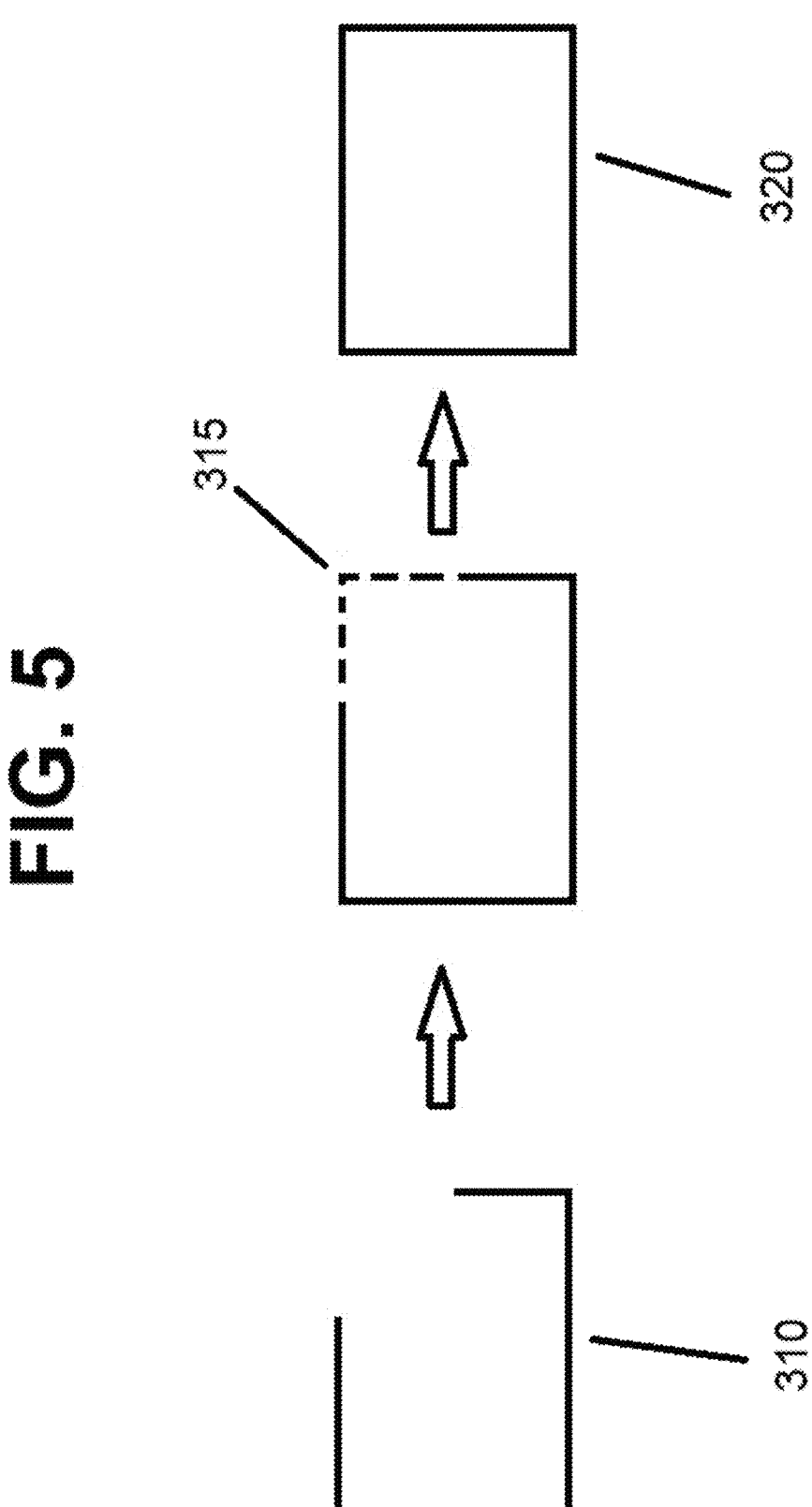
FIG. 5 illustrates omitted data points for a structure being determined and filled in according to an exemplary embodiment of the present general inventive concept.

According to exemplary embodiments of the present general inventive concept, the platform 100 may determine if the data set received from the measurements database 300 is incomplete, for example if the received data set does not include measurements data for parts of the identified worksite. If such a determination is made, according to exemplary embodiments of the present general inventive concept the platform 100 may use the available parsed data points to determine any such missing data, and subsequently fill in the missing data in the data set. As an example, if part of an identified worksite structure is obscured and so information on the obscured section was not included in the measurements database 300, the platform 100 may calculate the dimensions of the obscured section based on the dimensions that were included in the data set. FIG. 5 illustrates an example, in which the data set received from the measurements database 300 includes data 310, in which a portion of the structure was omitted. As illustrated therein, the platform 100 may generate data for the dimensions of the missing areas 315, represented as dashed lines. In the exemplary embodiment of the present general inventive concept shown in FIG. 5, the platform 100 may calculate the length of missing walls based on the length of opposite walls, since buildings are commonly built as regular polygons such as rectangles. The platform 100 may therefore generate completed data 320 which includes the data 310 received from the measurements database 300 and data on missing areas 315. In this manner, the platform 100 may calculate the dimensions of a worksite even if the measurements database 300 has incomplete data.

The platform 100 may also use the parsed data to generate rendering data for the selected worksite. For the purposes of this application, "rendering data" means information useable by the renderer 400 to generate a rendering 410. According to exemplary embodiments of the present general inventive concept, the rendering data may not be human readable. It may be, e.g., a set of data points, or an ASCII-based OBJ file. The platform 100 may send this generated rendering data to the renderer 400 as part of a request for a rendering 410. As described above, the platform 100 may fill in any missing parts in the available data, for example the lengths of walls which were not included in the measurements database 300. The platform 100 may further add additional rendering data determined based on the parsed information. If the information from the measurements database 300 is incomplete due to part of the structure being obscured, the platform 100 may fill in the missing measurements data as described above, and further may generate rendering data for parts of the structure that were not included in the measurements data. Based on the need to fill in this missing information, the platform 100 may further calculate that parts of the structure are shaded, for example obscured under a tree, and so are shielded from the sun for part or all of the day. According to an exemplary embodiment of the present general inventive concept, the platform 100 may generate rendering data indicating which parts of the structure are shaded.

According to an exemplary embodiment of the present general inventive concept, the platform 100 may further determine any additional features necessary to complete the desired exterior work. For example if the user is having roof work done, the platform 100 may determine which parts of the worksite, i.e., the roof, will require hip and ridge shingles, which are specialized shingles necessary to replace the roof correctly. The platform 100 may generate rendering data for these additional features, so that the renderer 400 may generate an accurate rendering 410 of the intended exterior work.

According to an exemplary embodiment of the present general inventive concept, the platform 100 may further generate rendering data for the entire structure, not just the worksite. According to exemplary embodiments of the present general inventive concept, the platform 100 may generate this rendering data for the entire structure through extrapolation based on the worksite. For example, if the data set received from the measurements database 300 includes data points for a structure's roof, after calculating the roof geometry as described above, including lengths and locations of corners of the roof, the platform 100 may use this roof geometry to determine the location and shape of the structure's walls. For example, the platform 100 may determine the walls are vertically straight down from the edges of the roof. Alternatively, the platform 100 may determine the structure's walls are inset from the edges of the roof by a predetermined overhang. Alternatively, or in addition, if the data set received from the measurements database 300 included images of the structure, as noted above the platform 100 may parse the images to determine the location of the structure's walls, and may further determine any structural features of these walls, e.g., windows, as described in detail above. The platform 100 may accordingly generate rendering data for the walls and other structural features to send to the renderer 400 as part of a request for a rendering 410.

Figure 6A:
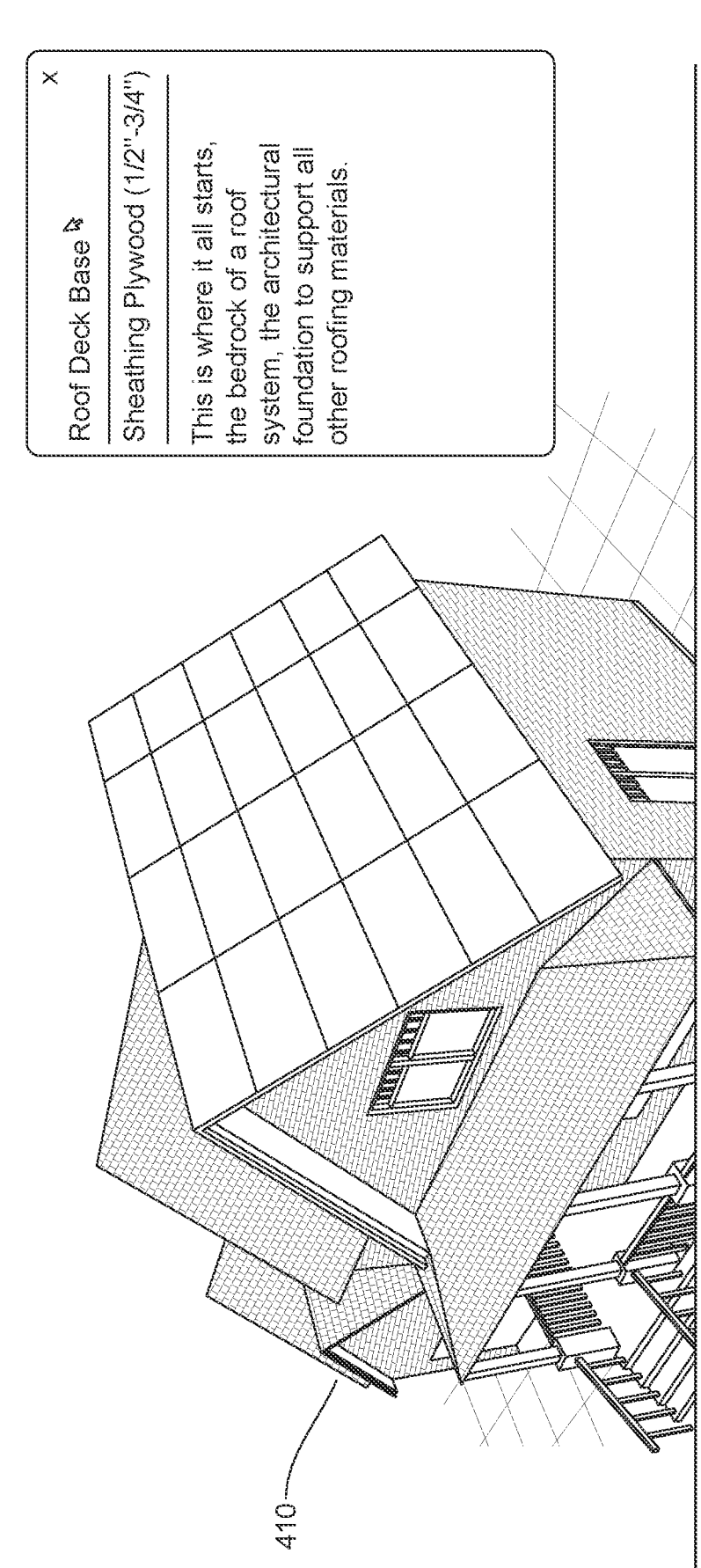
FIGS. 6A-6B illustrate output pages including renderings generated according to exemplary embodiments of the present general inventive concept.
Figure 6B:
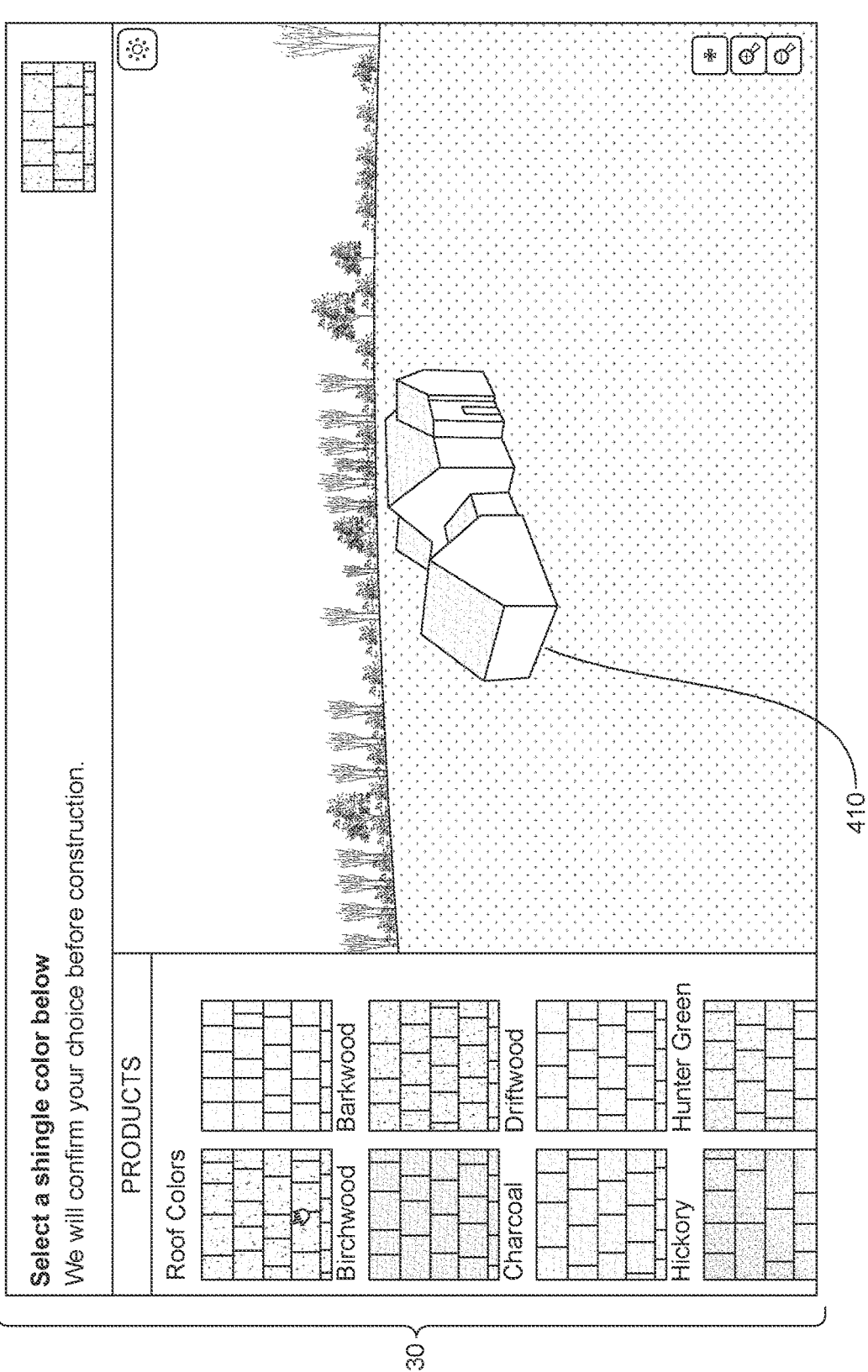

Upon receiving the request for a rendering from the platform 100, the request including the generated rendering data, at Step S205 the renderer 400 may generate a rendering 410 of the worksite including a 3D image of the worksite or the entire structure. The rendering 410 may be sent back to the platform 100 to be displayed as an output page on the user device 200. Output pages including renderings 410 according to exemplary embodiments of the present general inventive concept are illustrated in FIGS. 6A-6B. According to exemplary embodiments of the present general inventive concept, the user may input commands via the user device 200 to instruct the platform 100 to change the view of the displayed rendering 410, for example allowing the user to see the rendering 410 from any desired angle, or to zoom in to see any desired section of the rendering 410 more closely.

According to exemplary embodiments of the present general inventive concept, if the platform 100 provides rendering data for the entire structure, the rendering 410 may include not just the intended worksite, but the entire structure. For example, as illustrated in FIG. 6B, the rendering 410 may display a roof the user wants work done on, as well as a model of the rest of the structure. Furthermore, if the rendering data received from the platform 100 included relevant environmental data, e.g., which parts of the structure are shaded, the rendering 410 may include these features, for example by illustrating the shading over the relevant parts of the structure.

According to exemplary embodiments of the present general inventive concept, as part of generating the rendering 410, the renderer 400 may apply one or more surface textures 415 to represent the proposed exterior work at the worksite. The surface texture 415 may be generated such that details of the texture 415 match the geometry of the structure. For example, if a user desires a rendering of a roof, the renderer may generate a rendering 410 of this roof, the rendering 410 including a surface texture 415 illustrating multiple rows of shingles, as a completed roof would include. A rendering 410 including such a surface texture 415 is illustrated in FIG. 6B. According to exemplary embodiments of the present general inventive concept, the renderer 400 may map a surface texture 415 to match the proposed exterior work. For example if the surface texture 415 is rows of shingles, the renderer 400 may map the texture 415 such that the rows of shingles are aligned around corners, i.e., each row of shingles on each face of the rendered roof lines up with a corresponding row of shingles on the other faces of the roof. In this manner, the applied surface texture 415 may be an accurate representation of what the structure will look like following the proposed work, thereby allowing the final product to be visualized before work begins.

Figure 7:
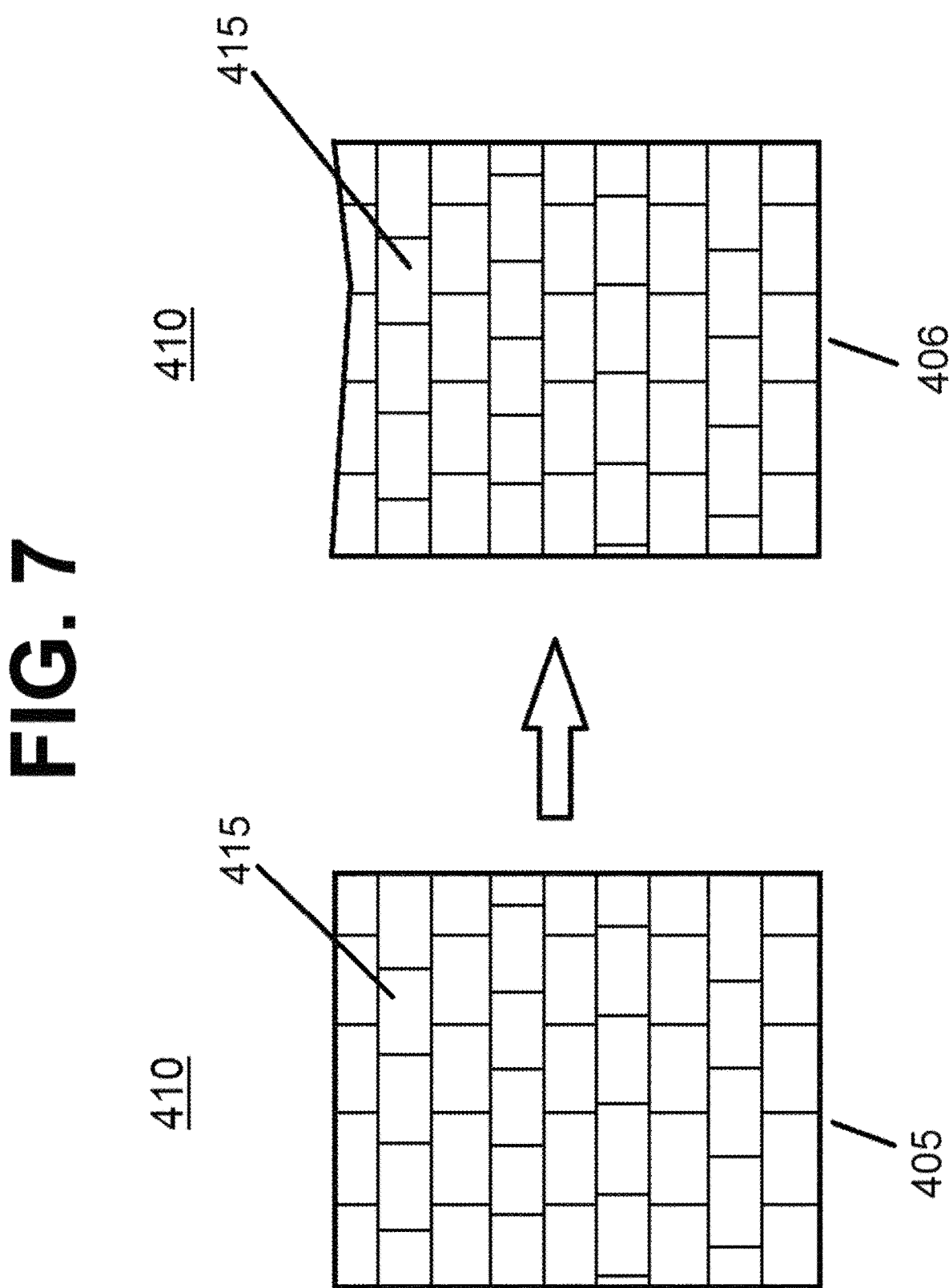
FIG. 7 illustrates a texture of a rendering being adjusted according to an exemplary embodiment of the present general inventive concept.

In generating the rendering 410, the renderer 400 may account for inconsistencies and imperfections in the structure. Real-world structures often have imperfections, e.g., lines that are not perfectly straight, walls that are not parallel, etc. FIG. 7 illustrates how a rendering 410 may be adjusted to account for imperfections according to an exemplary embodiment of the present general inventive concept. As illustrated therein, based on the rendering data received from the platform 100, the renderer 400 may generate one or more polygons representing the structure. These polygons may be the same polygons defined by the parsed data points from the measurements database 300. According to an exemplary embodiment of the present general inventive concept, based on the rendering data received from the platform 100 the renderer 400 may first generate one or more rendering polygons 406, such rendering polygon(s) 406 representing the actual structure as it would appear in the rendering 410, including imperfections as indicated in the parsed data points from the measurements database 300. Based on these one or more rendering polygons 406, the renderer 400 may further generate an idealized polygon 405 corresponding to each rendering polygon 406, such idealized polygon(s) 405 including no imperfections. The renderer 400 may map the desired texture 415 to the idealized polygon 405 in order to generate the ideal dimensions of the texture 415. Based on these ideal dimensions, the renderer 400 may then map the desired texture 415 to the corresponding rendering polygon 406. In FIG. 7 an imperfection at the top face of the rendering polygon 406 is exaggerated for illustrative purposes. In order to make the texture 415 fit the rendering polygon 406, the renderer 400 may adjust or "stretch" the texture 415 to match the actual edges of the polygon 406. If the texture 415 is already sized for an idealized polygon 405, "stretching" the texture 415 to match the rendering polygon 406 may cause minimal distortion to the texture 415, and the resulting rendering 410 may accurately visually represent the desired exterior work.

Returning to FIG. 2, according to exemplary embodiments of the present general inventive concept at Step S206 the user may input commands into the platform 100 to edit the rendering 410, changing details of the desired work. As noted above, according to exemplary embodiments of the present general inventive concept the default assumption may be that the requested exterior work is replacing all materials at the selected worksite, e.g., a new roof, new siding, replacement windows, etc. At Step S206, once the rendering 410 has been made for the worksite, the user may input commands at the user device 200 to specify the exterior work and which portions of the worksite are to be worked on or replaced. For example, the user may indicate specific parts of the worksite roof or siding they would like patched or replaced. Furthermore, the user may make selections of any replacement materials. For example, if the user is using the platform 100 for an estimate on roof replacement, the user may input commands on the user device 200 to specify e.g., the shingle color, shingle style, etc., as well as to add new features such as, for example, skylights or solar panels. FIG. 6B illustrates a user interface 130 to modify a rendering 410 according to exemplary embodiments of the present general inventive concept. As illustrated therein, user interface 130 may display rendering 410 of the identified structure, as well as available options for the user to select to modify the rendering 410. In the exemplary embodiment illustrated in FIG. 6B, the available options are roof colors. It will be understood that according to other exemplary embodiments of the present general inventive concept, other options may be selected, including, for example, shingle styles, different roof types (metal, asphalt, etc.), and so on, as well as options to select a portion of the worksite for exterior work. FIG. 8 illustrates a user interface 140, for example displayed on a user device 200, to add additional features such as skylights, solar panels, etc., according to an exemplary embodiment of the present general inventive concept. According to an exemplary embodiment of the present general inventive concept, if the data set from the measurements database 300 included the materials the structure is made from, the user may be presented with options matching the existing materials. For example, if the data set from the measurements database 300 indicated the worksite uses asphalt shingles for the roof, a user getting an estimate for roof work through the system 10 may be presented with roof options including asphalt shingles and excluding other options, e.g., a metal roof. According to exemplary embodiments, the user may input a command at the user device 200 to show all available options for exterior work, even those that do not match the materials the structure is made from.

If the user makes changes to the rendering 410, the platform 100 may return to Step S205 to modify the rendering 410 to show the user's requested changes. The platform 100 may change the rendering 410 directly, or according to other exemplary embodiments of the present general inventive concept the platform 100 may generate rendering data representing the user's requested changes, and may forward this new rendering data to the renderer 400 as a request for an updated rendering 410. The updated rendering 410 may be received at the platform 100 and displayed as described above. Changing the rendering 410 may allow a user to view how a variety of different options would look on their worksite before finally selecting the specific work to request. If a texture 415 such as shingles has already been "stretched" and sized to the structure, then the renderer 400 may replace this texture 415 with another one while maintaining the same adjusted or "stretched" dimensions. As such, the renderer 400 may illustrate different exterior finishes, for example different shingle styles or colors, without needing to recalculate the size of the texture 415. As a result, the cosmetic appearance of the rendering 410 may be changed quickly, such that a user may try several different appearances for the desired exterior work before deciding on which one to proceed with.

If the user inputs commands to add features such as skylights or solar panels, the platform 100 may determine whether such features are possible or recommended. According to an exemplary embodiment of the present general inventive concept, if the platform 100 has previously determined that a roof is partly or completely shaded and the user inputs a command to add solar panels, the platform 100 may notify the user that solar panels are not recommended, since the roof does not receive direct sunlight. According to another exemplary embodiment of the present general inventive concept, the platform 100 may prevent the user from choosing to add solar panels if it has been determined the roof is partially or completely shaded.

According to exemplary embodiments of the present general inventive concept, while modifying the rendering 410 the user may also input additional commands into the platform 100 to schedule the requested exterior work, including, for example, specifying a preferred start date.

Once the user has viewed the rendering 410 and made their selections for the exterior work, including, e.g., shingle type, shingle color, modifications such as skylights, etc., made any additional commands including, e.g., specifying a preferred start date, and has confirmed their selections, at Step S207 the platform 100 may generate an estimate for the exterior work. As part of generating such an estimate, the platform 100 may generate a materials list for the work based on the parsed data points from the measurements database 300, the rendering 410, and the user's selections. For example, for roof work the platform 100 may determine a materials list for the proposed work based on the retrieved area of the roof and any determined features, for example rakes, eaves, valleys, etc., and any flat portions of the roof, as well as the type of shingles the user selects. According to exemplary embodiments of the present general inventive concept, the platform 100 may store data on materials required for exterior work, based on factors including size of the worksite and type of work being done. The platform 100 may further store data on materials required to account for worksite features, for example boots, chimneys, and flat roofs, which may have been previously determined while parsing the data set received from the measurements database 300 at step S204. The platform 100 may determine a materials list based on this stored data on materials required for exterior work. Based on the parsed data points from the measurements database 300 and the determined materials list, the platform 100 may calculate the labor, e.g., estimated number of hours, required for the exterior work. According to exemplary embodiments of the present general inventive concept, the platform 100 may further determine if there are any other considerations, for example if any licenses or permits must be secured or local fees must be paid to perform the exterior work. The platform 100 may then send a query to the Cost Server 500 for the associated costs of this determined materials, labor, etc.

The Cost Server 500 may be one or more servers storing cost information on exterior work. The platform 100 may access the Cost Server 500 via, e.g., wired connection, LAN, the Internet, or the like. According to exemplary embodiments of the present general inventive concept, the Cost Server 500 may be integrated with the platform 100.

The cost information stored in the Cost Server 500 may include, for example, costs of materials and labor rates for a given geographic area, as well as any associated costs such as warranties and local rules, for example the cost of any permits, licenses, local fees, and so on which may need to be paid as part of doing exterior work. According to an exemplary embodiment of the present general inventive concept, the Cost Server 500 may further store historical data on exterior work that has been performed in a given geographic area. This data may include high and low costs over a given span of time, as well as an average cost for a given type of exterior work in the area.

As noted above, the platform 100 may calculate the required materials, labor, and other requirements for the proposed exterior work. The platform 100 may then send a query to the Cost Server 500 for the associated costs of these determined materials, labor, etc. The Cost Server 500 may reply to the query with a set of cost information. For example, the cost information may include a standard hourly rate for labor, and an itemized cost list for the determined materials list. According to exemplary embodiments of the present general inventive concept, the cost information may also include the cost of any licenses, permits, local fees, etc. that the platform 100 may determine are necessary for the proposed exterior work. According to exemplary embodiments of the present general inventive concept, the cost information may further include an average cost for exterior work in a geographic area of the worksite.

Based on the cost information received from the Cost Server 500, the platform 100 may generate an estimated cost for the proposed exterior work at the worksite. According to exemplary embodiments of the present general inventive concept, once the platform 100 generates the estimated cost, it may compare this estimated cost to an average cost for exterior work in the geographic area of the worksite. If the platform 100 determines a major discrepancy between the estimated cost for the proposed exterior work and the average cost for exterior work in the geographic region, the platform 100 may adjust the generated estimate to be closer to the average cost. According to exemplary embodiments of the present general inventive concept, a "major discrepancy" may be an estimated cost that is 35 percent higher or lower than the average cost, and if such a major discrepancy is detected, the platform 100 may adjust the estimated cost to be within 35 percent of the average cost. It will be understood that according to other exemplary embodiments of the present general inventive concept, a "major discrepancy" may be a different percentage variation from the average cost for exterior work, and the platform 100 may adjust the estimated cost to within a different percentage of the average cost if a major discrepancy is determined.

The platform 100 may display the calculated estimate to the user at the user device 200. The estimate may be all-inclusive, i.e., including cost of materials, labor, licenses, etc. According to exemplary embodiments of the present general inventive concept, this estimate may be generated immediately after the user has confirmed their selections, e.g., colors, styles, and start date for the exterior work. The estimate may be displayed as an output on the user device 200. According to other exemplary embodiments of the present general inventive concept, the estimate may be provided to the user at a later time, for example via the user's e-mail, once the estimate has been fully calculated. In such exemplary embodiments, the platform 100 may prompt the user to input their contact information, for example at the profile creation interface 110, so that they may be contacted once the estimate is ready. In either case, once the estimate has been provided to the user, the platform 100 may prompt the user to approve the estimate, signaling their agreement to start the proposed exterior work.

According to the above exemplary embodiment of the present general inventive concept, the platform 100 may calculate the estimate for the exterior work after the user has made all their edits in Step S206. According to other exemplary embodiments of the present general inventive concept, at Step S205 when the rendering 410 is first made, the platform 100 may determine materials, labor, etc. for the proposed exterior work, and may query the Cost Server 500 for the associated costs. The platform 100 may accordingly generate a preliminary estimate for the exterior work at the same time as the rendering 410 is made. If the user makes edits to the rendering at Step S206, the platform 100 may recalculate the estimate at the same time as it updates the rendering 410.

According to exemplary embodiments of the present general inventive concept, once the estimate has been calculated, if the platform 100 determines that one or more permits are necessary for the proposed exterior work, the platform 100 may fill out any requests or paperwork for such permits with available data, for example the user's name and the worksite address, which may have been gathered from the user interfaces 110 and 120 in which a user may have entered this information into the platform 100.

According to exemplary embodiments of the present general inventive concept, the platform 100 may also determine whether to contact a user's insurance for the requested exterior work. For example, in an exemplary embodiment of the present general inventive concept, at Step S202 illustrated in FIG. 2, the platform 100 may determine based on the input identifying information of the worksite whether there has been a damaging event at that location. For the purposes of this application, a "damaging event" is an event that may require exterior repair, such as, for example, a storm. The platform 100 may search an external database, e.g., an online database such as a weather database, for any such damaging events that occurred within a preset time. This preset time may be, for example, two months, but it will be understood that the preset time may vary depending on the exemplary embodiment of the present general inventive concept. If the platform 100 determines that such an event has occurred within the preset time, the platform 100 may display a prompt on the user device 200 asking the user whether they would like to manage the exterior work through their insurance company. If the user agrees to proceed through their insurance, the platform 100 may prompt the user to enter their insurance information, e.g., carrier, policy number, etc. Once an estimate for the exterior work is determined, the platform 100 may contact the user's insurance with the determined estimate for work and request approval therefrom. According to exemplary embodiments of the present general inventive concept, the platform 100 may also determine if additional steps need to be taken to work through insurance, such as, for example, securing an inspection report on the worksite. If any such steps need to be taken, the platform 100 may account for these steps, such as, for example, prompting the user to schedule an in-person inspection of the identified worksite.

Once a user has approved the estimate for exterior work, the platform 100 may save all details on the work for later access, for example to illustrate the status of payment or of the work itself. An example of a user interface 150 to display work details, which may be displayed on a user device 200 according to exemplary embodiments of the present general inventive concept, is illustrated in FIG. 9.

According to exemplary embodiments of the present general inventive concept, an insurance company may access the platform 100 to arrange payment for the exterior work, for example if the exterior work is being handled through the user's insurance. According to other exemplary embodiments of the present general inventive concept, the user may personally arrange for payment for the exterior work through the platform 100.

According to an exemplary embodiment of the present general inventive concept, a user may also pre-register a structure by generating a user account and inputting identifying information, e.g., an address, as above. The user may also indicate which type of exterior work, e.g., roof, walls, windows, etc., they wish to pre-register for, and input their insurance information as above. After such pre-registration has occurred, the platform 100 may periodically check an external database such as a weather database to determine if a damaging event has occurred. If the platform 100 determines that such a damaging event has occurred, the platform 100 may contact the pre-registered user, for example via e-mail, to ask the user if they need exterior work. Alternatively, when the platform 100 determines that a damaging event has occurred, the platform 100 may automatically calculate an estimate for exterior repairs for users who have pre-registered. The platform 100 may contact such users with the calculated estimate, including estimates for emergency work, e.g., tarps over holes in a roof, etc. According to exemplary embodiments of the present general inventive concept, the cost of such emergency work may be stored in the Cost Server 500, and the platform 100 may determine an estimate for emergency work by querying the Cost Server 500 similarly to determining the cost of exterior work as described above. In this manner, users who have experienced an emergency such as a storm may have an estimate for repairs on-hand almost immediately, without needing to schedule an appointment in advance. The estimate may be forwarded to the user's insurance as above. Payment for the work may also be managed through the platform 100 as described above. According to some exemplary embodiments of the present general inventive concept, payment for the exterior work may be handled by the user. According to other exemplary embodiments of the present general inventive concept, payment may be handled directly by the insurance company through the platform 100.

According to exemplary embodiments of the present general inventive concept, the platform 100 may query the user on whether they would like to secure financing for the proposed exterior work. The platform 100 may prompt the user to input, e.g., their name, contact information, and social security number. The platform 100 may use the input information to secure financing, for example by confirming the user's credit score and contacting a bank for approval for financing. The platform 100 may also generate a form for the user to sign to agree to any approved financing, and pre-populate the form with information already received from the user, e.g., name, address of the worksite, etc.

Systems and methods according to exemplary embodiments of the present general inventive concept may coordinate multiple sources of data which a user does not have ready access to, and may translate non-human-readable data retrieved from these sources into a format readable by different services. For example, the platform 100 may translate the data set from the measurements database 300 to a format readable by the renderer 400, thereby facilitating preparation of a rendering of a selected worksite, as well as determination of an estimate for exterior work at that worksite. The estimate may be based on a rendering 410 of the exterior work and available data on costs as saved in the Cost Server 500, and furthermore a user may view the rendering 410 in advance, giving them a better idea of what the work will look like before they agree to it.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A system to generate an estimate on exterior work, the system comprising:

a measurements database storing predetermined measurements data of structures, the predetermined measurements data including one or more dimensions of structures, and further configured to receive a query over a communication network identifying a structure, and to generate a non-human-readable data set for the identified structure in response to receiving the query, the data set including the stored measurements data for the identified structure;

a renderer configured to receive a request for a rendering over the communication network and to generate a three-dimensional rendering in response to receiving the request, the rendering being based on received rendering data; and a platform configured to accept a user input comprising identifying information including a location of a structure and a worksite corresponding to a selected portion of the identified structure, to convert the received identifying information to a format readable by the measurements database, to connect to the communication network and transmit a first command signal to the measurements database, the first command signal comprising a query including the converted identifying information and controlling the measurements database to transmit a data set for the identified structure, the platform being further configured to receive the data set for the identified structure from the measurements database over the communication network in response to the transmitted query, to parse the received data set for data points defining at least one dimension of the identified worksite, to generate non-human-readable rendering data for the identified worksite by translating the parsed data points into a format readable by the renderer, to transmit a second command signal to the renderer over the communication network to generate a rendering of the worksite, the second command signal comprising a request including the generated rendering data and controlling the renderer to generate a rendering based on the generated rendering data, the platform being further configured to receive the rendering from the renderer over the communication network in response to the transmitted request, to determine requirements of exterior work based on the at least one dimension of the identified worksite, and to generate an estimate on exterior work for the worksite based on the determined requirements, wherein the second command signal controls the renderer to generate the rendering by generating a first set of polygons based on the parsed data points, generating a second set of polygons by removing imperfections from the lines of the first set of polygons, applying a texture to the second set of polygons, and then adjusting the texture according to the removed imperfections to apply the texture to the first set of polygons.

2. The system of claim 1, wherein the platform is configured to determine a shape and dimensions of the worksite based on the parsed data points.

3. The system of claim 2, wherein the platform is configured to determine one or more polygons which define the shape of the worksite.

4. The system of claim 1, wherein the platform is further configured to determine locations of structural features of the identified structure based on the received data set.

5. The system of claim 1, wherein the platform is further configured to determine and fill in missing data on the identified structure in the received data set, based on the parsed data points.

6. The system of claim 1, wherein the platform is further configured to modify the rendering according to user commands, and to generate the estimate for the exterior work based on the user commands.

7. The system of claim 1, wherein the platform is further configured to connect to an external database to determine if a damaging event has occurred at the identified structure within a preset time.

8. A method of generating an estimate on exterior work, the method comprising:

storing predetermined measurements data of structures at a measurements database, the predetermined measurements data including one or more dimensions of structures;

accepting a user input at a platform, the user input comprising identifying information identifying a location of a structure and a worksite, the worksite corresponding to a selected portion of the identified structure;

converting the received identifying information to a format readable by the measurements database;

transmitting a query including the converted identifying information to the measurements database over a communication network as a first command signal to control the measurements database to transmit a data set for the identified structure;

generating a non-human-readable data set for the identified structure at the measurements database in response to receiving the query, the data set including the stored measurements data for the identified structure;

receiving the generated data set for the identified structure from the measurements database over the communication network;

parsing the received data set for data points relating to at least one dimension of the identified worksite;

generating non-human-readable rendering data for the identified worksite by translating the parsed data points into a format readable by a renderer;

transmitting a request including the generated rendering data to a renderer over the communication network as a second command signal to control the renderer to generate a rendering based on the generated rendering data;

generating a three-dimensional rendering of the worksite at the renderer in response to receiving the request, the rendering being based on the transmitted rendering data;

determining requirements of exterior work based on the at least one dimension of the identified worksite; and generating an estimate on exterior work for the worksite based on the determined requirements, wherein the second command signal controls the renderer to generate the rendering by generating a first set of polygons based on the parsed data points, generating a second set of polygons by removing imperfections from the lines of the first set of polygons, applying a texture to the second set of polygons, and then adjusting the texture according to the removed imperfections to apply the texture to the first set of polygons.

9. The method of claim 8, further comprising determining a shape and dimensions of the worksite based on the parsed data points.

10. The method of claim 9, further comprising determining one or more polygons which define the shape of the worksite.

11. The method of claim 8, further comprising determining locations of structural features of the identified structure based on the received data set.

12. The method of claim 8, further comprising determining and filling in missing data on the identified structure in the received data set, based on the parsed data points.

13. The method of claim 8, further comprising:

modifying the rendering according to user commands; and generating the estimate for the exterior work based on the user commands.

14. The method of claim 8, further comprising connecting to an external database to determine if a damaging event has occurred at the identified structure within a preset time.

15. The system of claim 1, wherein the platform is further configured to receive a user input modifying the rendering, to generate updated rendering data reflecting the user input, to transmit the updated rendering data to the renderer as a request for an updated rendering, and to receive the updated rendering from the renderer in response to the request.

16. The method of claim 8, further comprising:

receiving a user input at the platform to modify the rendering;

generating updated rendering data reflecting the user input; and generating an updated rendering at the renderer based on the updated rendering data.

17. The system of claim 1, wherein the measurements database is configured to store the measurements data of structures in a non-human-readable format.

18. The method of claim 8, further comprising storing the measurements data of structures in the measurements database in a non-human-readable format.

19. The system of claim 1, wherein the requirements of exterior work include at least one of materials, labor, and fees.

20. The method of claim 8, wherein the requirements of exterior work include at least one of materials, labor, and fees.

21. The system of claim 1, further comprising a cost server configured to store cost information on exterior work, wherein the platform is configured to transmit a query to the cost server based on the determined requirements of the exterior work, to receive a set of cost information from the cost server in response to the query, and to generate the estimate on exterior work for the worksite based on the received set of cost information.

22. The method of claim 8, further comprising transmitting a query to a cost server based on the determined requirements of the exterior work; and receiving a set of cost information from the cost server in response to the query; and generating the estimate on exterior work for the worksite based on the received set of cost information.

23. The system of claim 1, further comprising:

a user device configured to connect to a wireless network, to transmit the user input comprising the identifying information to the platform via the wireless network as a command to generate an estimate on exterior work for the worksite, and to transmit one or more commands to the platform via the wireless network to modify the rendering.

24. The method of claim 8, further comprising:

connecting a user device to a wireless network;

transmitting the user input comprising the identifying information to the platform via the wireless network as a command to generate an estimate on exterior work for the worksite; and transmitting one or more commands to the platform via the wireless network to modify the rendering.

25. The system of claim 1, wherein the second command signal further controls the renderer to apply the adjusted texture to the rendering.

26. The method of claim 8, wherein the second command signal further controls the renderer to apply the adjusted texture to the rendering.

27. A platform, comprising:

a server configured to accept a user input comprising identifying information including a location of a structure and a worksite corresponding to a selected portion of the identified structure, to convert the received identifying information to a format readable by an external measurements database, to connect to a communication network and transmit a first command signal to the external measurements database, the first command signal comprising a query including the converted identifying information and controlling the external measurements database to transmit predetermined measurements data for the identified structure, the server being further configured to receive the predetermined measurements data over the communication network in response to the transmitted query, to parse the received measurements data for data points defining at least one dimension of the identified worksite, to generate non-human-readable rendering data for the identified worksite by translating the parsed data points into a format readable by an external renderer, to transmit a second command signal to the external renderer over the communication network to generate a rendering of the worksite, the second command signal comprising a request including the generated rendering data and controlling the external renderer to generate a three-dimensional rendering based on the generated rendering data, the server being further configured to receive the rendering from the external renderer over the communication network in response to the transmitted request, to determine requirements of exterior work based on the at least one dimension of the identified worksite, and to generate an estimate on exterior work for the worksite based on the determined requirements, wherein the second command signal controls the external renderer to generate the rendering by generating a first set of polygons based on the parsed data points, generating a second set of polygons by removing imperfections from the lines of the first set of polygons, applying a texture to the second set of polygons, and then adjusting the texture according to the removed imperfections to apply the texture to the first set of polygons.

\* \* \* \* \*